May 7, 1963  V. J. RIGOLINI  3,088,389
CAMERA

Filed May 1, 1961  2 Sheets-Sheet 1

May 7, 1963 V. J. RIGOLINI 3,088,389
CAMERA

Filed May 1, 1961 2 Sheets-Sheet 2

3,088,389
CAMERA
Vinnie J. Rigolini, Brooklyn, N.Y., assignor to Whitehouse Products, Inc., Brooklyn, N.Y., a corporation of New York
Filed May 1, 1961, Ser. No. 106,713
12 Claims. (Cl. 95—31)

The present invention relates to roll film cameras, and more particularly to film metering and double exposure prevention devices for use in such cameras.

In roll film cameras it is desirable to have some means of automatically metering the amount of film advanced after each picture is taken. It is also desirable to have an interlock mechanism to prevent the shutter from being actuated more than once each time the film is advanced so that the camera operator will be prevented from inadvertently making double exposures. Devices to perform these functions have been known. For example, it is well known to provide a device which locks the film advancing mechanism, in response to the position of a film metering wheel, after a predetermined amount of film has been advanced; and such devices have also been combined with interlocks with the shutter actuating mechanism to prevent the shutter from being actuated more than once each time the film is advanced thus to prevent inadvertent double exposures. The device of the present invention performs these functions in a simpler and more reliable manner than those devices in the prior art, and has the additional feature that the shutter mechanism is cocked by the operation of the film advancing mechanism so that the camera may be prepared for taking a picture by simply winding the film advancing mechanism. Means are also provided to render the film metering and interlocking mechanism inoperative so that film may conveniently be inserted in the camera and removed from it.

Accordingly, it is an object of this invention to provide an improved film metering and double exposure prevention device for a roll film camera.

A further object of this invention is to provide such a device in conjunction with a shutter cocking mechanism operated by the film advancing mechanism.

A still further object of this invention is to provide, in conjunction with a film metering and double exposure preventing device, means to render the device inoperative when film is being inserted into or removed from the camera.

In carrying out these objects in accordance with one embodiment of this invention, a film metering wheel is provided which engages and is rotated by the film strip as it is advanced. This metering wheel is equal in circumference to the length of film which is to be advanced for each picture, and has a notch on its periphery which cooperates with a pawl spring biased into engagement with it. A ratchet is mounted on the film advancing shaft and a second pawl is spring biased into engagement with this ratchet, but the second pawl and the first pawl are so interconnected that the second pawl can engage the ratchet only when the first pawl is in the notch in the metering wheel. Thus, as the film is advanced, the first pawl rides on the periphery of the metering wheel and the second pawl is held out of engagement with the ratchet, but when the appropriate amount of film has been advanced, and the first pawl is aligned with the notch on the film metering wheel, the first pawl drops into the notch on the metering wheel allowing the second pawl to engage the ratchet to lock the film advancing shaft against further rotation. A cam and slider arrangement is provided to cock the camera shutter as the film is advanced through the rotation of the film advancing shaft, and the slider is also interconnected with the two pawls. When the shutter is actuated the slider moves, and a lever associated with the slider is actuated to withdraw the first pawl from the notch in the metering wheel, thus also withdrawing the second pawl from the ratchet and permitting the film advance shaft to be rotated again. Rotation of the film advance shaft again cocks the shutter and moves the slider to permit the first pawl to ride again on the periphery of the metering wheel until the notch is reached, when the pawls will again operate to lock the film advance shaft. Thus a metered quantity of film will be advanced each time, and double exposures will be prevented since the shutter cannot be cocked for actuation unless the film has been advanced. A rod is provided to hold the second pawl out of engagement with the ratchet, and thus render the metering device inoperative, during loading or unloading of the camera so as to permit free winding of the "leader" and "trailer" strips on the film roll.

This invention is shown and described in the accompanying drawings and specification in conjunction with a specific camera. It is apparent, however, that the novel features of this film metering and interlocking mechanism could equally well be applied in cameras of other types. While it is not intended that the scope of this invention be limited to the particular embodiments shown, the invention may be more fully understood by reference to the accompanying drawings, in which.

Figure 1:
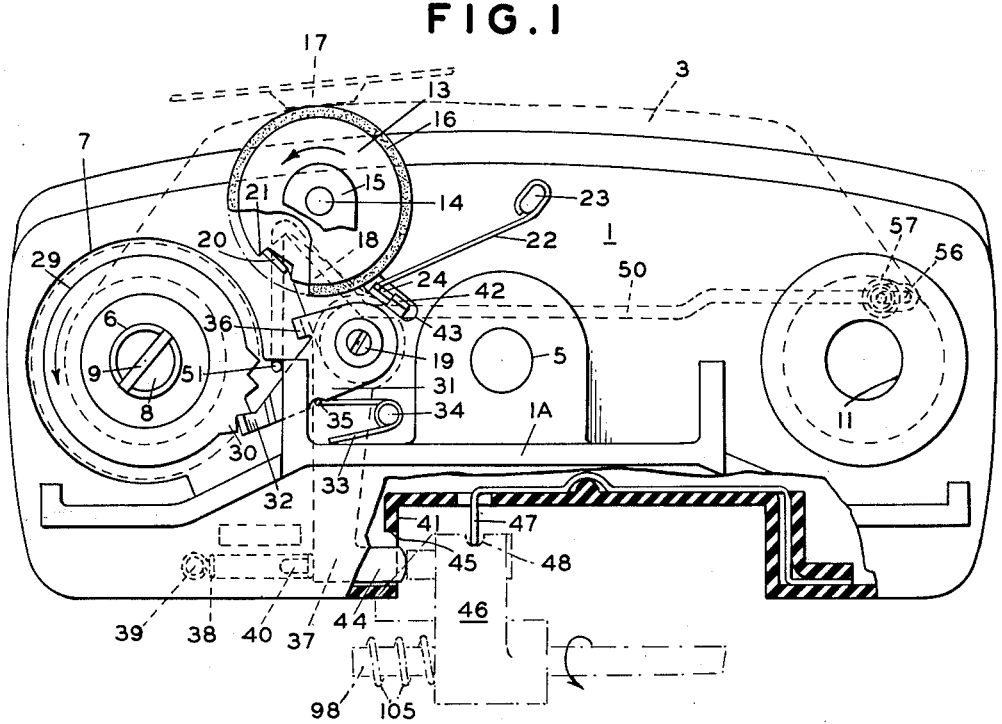
FIG. 1 is a top view, partly in section, of the camera cover plate showing the film metering device with the film advancing shaft locked against rotation.
Figure 2:
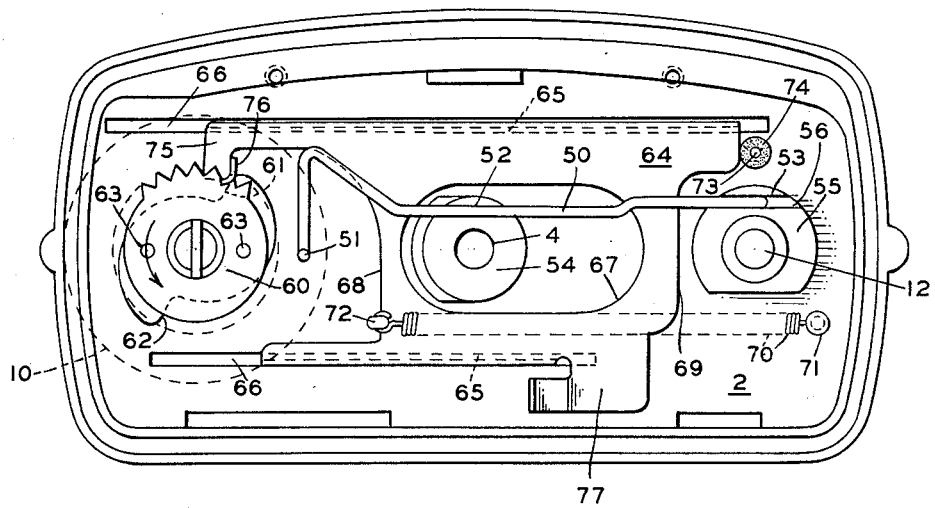
FIG. 2 is a top view of the base of the film cartridge showing the mechanism by which the shutter is cocked through rotation of the film advancing shaft.

Referring now to the drawings, FIG. 1 shows a cover plate 1 for a film cartridge base 2 which, when the camera is assembled, is mounted on the film cartridge base 2 shown in FIG. 2. A focal cone, shown diagrammatically at 3 in FIG. 1, is also connected to the cartridge base 2, and these three parts, secured together by a screw or other suitable means passing through holes 4 and 5 in cartridge base 2 and cover plate 1, respectively, form the film cartridge. The film take-up and supply spools (not shown) are mounted on the film cartridge.

The take-up spool is carried by a film advancing shaft 6, which is rotatably mounted in cartridge base 2 and projects upwardly through hole 7 in cover plate 1. The film advancing shaft 6 is provided with a hole 8 to receive the lower end of the take-up spool, and a cross bar 9 to cooperate with a corresponding notch in the take-up spool so that the take-up spool will rotate with shaft 6. The shaft 6 and the take-up spool are rotated by the operator through a knob 10 mounted on the outside of the camera body. The lower end of the supply spool projects through a hole 11 in the cover plate 1 and is rotatably mounted in a bushing 12 in cartridge base 2. The upper ends of the take-up and supply spools are held in place by a spring clip (not shown) secured to the top of focal cone 3. The film, as indicated in FIG. 1, runs from the supply spool over focal cone 3 and then onto the take-up spool. Counterclockwise rotation of film advancing shaft 6 (FIG. 1) through rotations of knob 10 causes the film to be advanced from the supply roll to the take-up spool.

Figure 3:
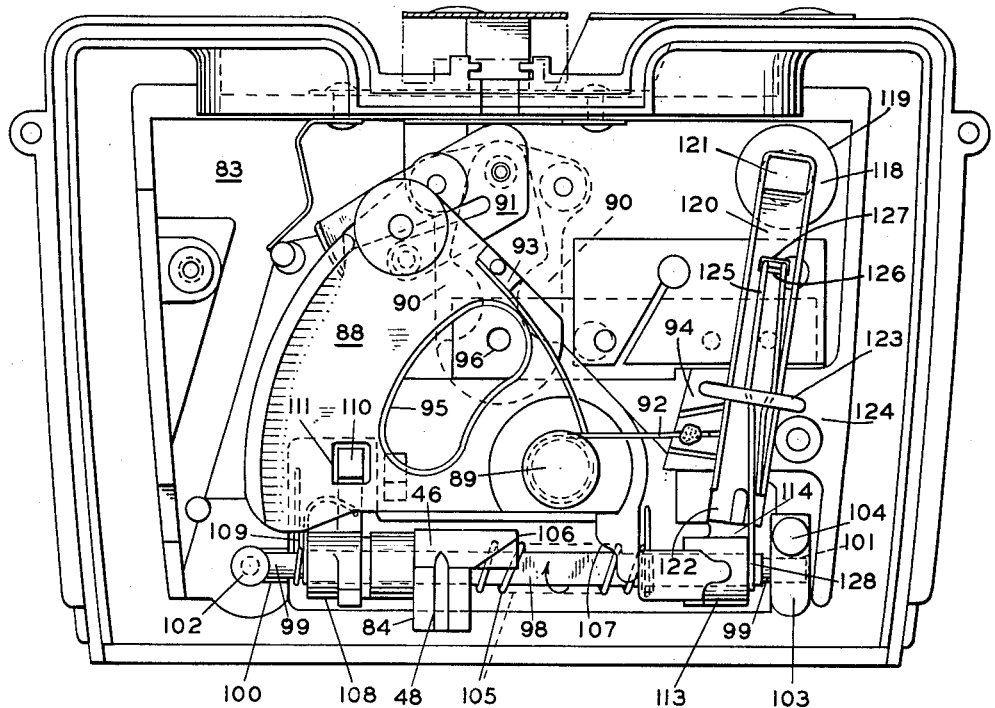
FIG. 3 is a back view of the camera with the back half of the camera body removed, showing the shutter cocking and actuating mechanism with the shutter in the cocked position.

With the film mounted on the cartridge as described above, the film cartridge is inserted into the bottom of the camera body, shown in FIG. 3, and latched in place in such a way that the various elements of the camera are appropriately aligned for taking pictures. Briefly, this is the general organization of the camera; the specific features of the present invention will now be described in detail.

Figure 4:
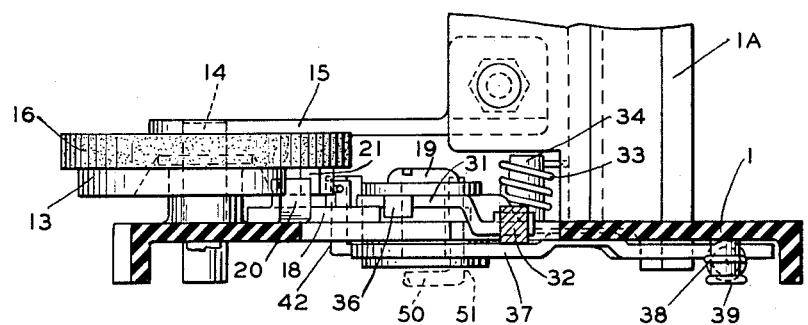
FIG. 4 is a side view of a portion of the cover plate shown in FIG. 1.

The film metering device is shown in FIGS. 1 and 4. As indicated, the purpose of this metering device is to regulate the amount of film advanced past focal cone 3 for each picture taken, so that the increment of film advanced each time will be exactly equal to the amount required for each picture. This is accomplished by locking film advancing shaft 6 against further rotation after the appropriate amount of film has been advanced.

To this end a film metering wheel 13 is provided which is rotatably mounted on shaft 14 on cover plate 1, and secured in place on the shaft by flat spring 15 which overlies film metering wheel 13 and is attached to upstanding wall 1A of cover plate 1, as best shown in FIG. 4. The film metering wheel 13 is provided, around its upper periphery, with a resilient strip 16 of rubber or some other suitable substance which engages the film strip and causes film metering wheel 13 to rotate as the film strip is advanced. A detent 17 is mounted on the back wall of the camera housing (not shown) to hold the film strip in engagement with resilient strip 16 on film metering wheel 13. The circumference of resilient strip 16 is exactly equal to the amount of film required for one picture so that film metering wheel 13 will make one complete revolution each time an amount of film equal to that required for one picture is advanced.

A pawl 18, which may be termed the "first" pawl, is pivotally mounted at a stud 19 on the top of cover plate 1. This pawl 18 is provided with an upturned end 20 which engages a notch 21 formed in the lower periphery of film metering wheel 13 when it is aligned therewith, and at other times rides on the lower periphery of film metering wheel 13. The first pawl 18 is urged into engagement with the periphery of film metering wheel 13 by a wire spring 22 secured at one end to lug 23 on cover plate 1 and at its other end engaging an upturned tab 24 on first pawl 18.

A ratchet 29 is rigidly secured on film advancing shaft 6 to rotate therewith, and is provided with a plurality of teeth 30 around its entire circumference. A second pawl 31 is also pivotally mounted to cover plate 1 at stud 19; second pawl 31 overlies first pawl 18, as may best be seen in FIG. 4. The second pawl 31 is provided with an upturned end 32 to engage teeth 30 on ratchet 29 and is spring biased into engagement with ratchet 29 by a torsion spring 33 mounted on a lug 34 and having an upturned end 35 engaging second pawl 31.

The second pawl 31 is also provided with a downturned tab 36 which is adapted to engage first pawl 18. When upturned end 20 of first pawl 18 is riding on the periphery of film metering wheel 13, downturned tab 36 engages first pawl 18, and the position of first pawl 18 is such that second pawl 31 is held out of the engagement with ratchet 29. However, when upturned end 20 on first pawl 18 engages notch 21 on film metering wheel 13, pawl 18 rotates in a clockwise direction, thus moving away from tab 36 and permitting second pawl 31 likewise to rotate in a clockwise direction. This permits upturned end 32 of second pawl 31 to engage teeth 30 on ratchet 29, locking film advancing shaft 6 against further rotation.

It is apparent that the pawls 18 and 31 will co-act to permit film to be advanced while first pawl 18 is disengaged from notch 21 on film metering wheel 13 and is riding on the periphery thereof, but will lock film advancing shaft 6 when first pawl 18 engages notch 21. Since first pawl 18 and notch 21 will be aligned once for each revolution of film metering wheel 13, and the circumference of resilient strip 16 is equal to the amount of film required for each picture, film advancing shaft 6 may be rotated until that amount of film defined by one revolution of film metering wheel 13 has been advanced, after which pawl 18 and notch 21 will be aligned, and film advancing shaft 6 will be locked by the interaction of the pawls 18 and 31.

A lever 37 is provided to disengage first pawl 18 from notch 21 on film metering wheel 13 after a picture is taken so that film advancing shaft 6 may again be rotated. The lever 37 is pivotally mounted at stud 19 beneath cover plate 1, as is shown in FIG. 4, and is biased in a counterclockwise direction by coil spring 38 fixed to lug 39 on cover plate 1 and ear 40 on lever 37. The counterclockwise rotation of lever 37 is limited by side wall 41 of cover plate 1. An upturned tab 42 on lever 37 extends upward through an elongated hole 43 in cover plate 1 and engages upturned tab 24 on first pawl 18.

When lever 37 is permitted to rotate counterclockwise, tab 42 will abut against tab 24 and, as coil spring 38 is stronger than the combined forces of wire spring 22 and torsion spring 33, will rotate first pawl 18 in a counterclockwise direction out of engagement with notch 21 causing pawl 18 to engage tab 36 on second pawl 31 and similarly rotating pawl 31 in a counterclockwise direction out of engagement with ratchet 29.

Lever 37 is permitted to rotate counterclockwise to disengage pawls 18 and 31 only after a picture has been taken and it becomes necessary that the pawls 18 and 31 be disengaged so that the film may be advanced; otherwise lever 37 is held out of engagement with pawls 18 and 31 so that the pawls can meter the film. An arm 44 on lever 37 extends out through opening 45 in side wall 41 of cover plate 1, and lever 37 is rotated in a clockwise direction out of engagement with the pawls by a cocking slider 46 abutting against arm 44 when the camera shutter mechanism is cocked. Cocking slider 46 will be discussed in greater detail later; at present it is sufficient to say that cocking slider 46 is moved to the position shown in FIG. 1 as the shutter mechanism of the camera is cocked, and is caught and held in that position by a latch 47 engaging in a notch 48. Upon actuation of the shutter mechanism cocking slider 46 is released from latch 47 and slides to the right permitting lever 37 to rotate counterclockwise and cause the two pawls 18 and 31 to be disengaged from film metering wheel 13 and ratchet 29, respectively. This permits film advancing shaft 6 to be rotated to advance the film.

The cocking slider 46, however, is actuated to cock the shutter mechanism by film advancing shaft 6 as will be later described, so that as film advancing shaft 6 is rotated to advance the film, cocking slider 46 will again be moved to the position shown in FIGURE 1 and will be caught and held in this position by latch 47, thus rotating lever 37 clockwise and moving its upturned tab 42 out of engagement with upturned tab 24 on first pawl 18. This permits first pawl 18 to engage film metering wheel 13 under the influence of wire spring 22. Since the film will have begun to advance as soon as film advancing shaft 6 was rotated, film metering wheel 13 will already have been rotated at least a small distance and notch 21 will no longer be aligned with first pawl 18. Therefore, first pawl 18 will engage the periphery of film metering wheel 13, and after the appropriate amount of film, defined by one revolution of film metering wheel 13, is advanced, first pawl 18 again will be aligned with, and will enter notch 21, in turn permitting second pawl 31, under the influence of torsion spring 33, to engage ratchet 29 and lock film advancing shaft 6 against further rotation.

Rolls of film for use in cameras such as the one embodying the present invention are conventionally provided with a long strip of opaque paper at each end of the film to protect the film from exposure to light as it is being inserted in the camera or removed therefrom. It is necessary that these "leader" and "trailer" strips be wound up on the take-up spool by film advancing shaft 6 in the same way that the film is advanced. Because of this, means are provided for rendering the metering device inoperative so that the camera operator can more readily wind up the "leader" and "trailer" strips on a roll of film. This is accomplished through rod 50. Rod 50 is provided with a vertically extending end portion 51. The rod 50 is slidably mounted in grooves 52 and 53 in bosses 54 and 55 in cartridge base 2, and an elongated hole 56 is provided beneath groove 53 through which the rod's end portion extends outside the camera body where it is provided with a handle 57. When the rod 50 is slid to its extreme left position (FIG. 1), it is inoperative to deactivate the metering device. However, when the rod 50 is slid to its extreme right position, vertically extending end portion 51 engages second pawl 31 and rotates pawl 31 counterclockwise, against the bias of the torsion spring 33 and out of engagement with ratchet 29. With second pawl 31 thus restrained from engagement with ratchet 29, the film metering device is inoperative, and the "leader" and "trailer" strips on a roll of film may be wound without interference.

Film metering wheel 13 continues to rotate while a "leader" or "trailer" is being wound until first pawl 18 engages notch 21, at which time film metering wheel 13 is locked. Since second pawl 31 does not lock film advancing shaft 6, however, the "leader" or "trailer" can still be advanced, and is dragged past film metering wheel 13.

The shutter mechanism on the camera is cocked by rotation of film advancing shaft 6. This is accomplished by the cam and slider mechanism mounted on the film cartridge which is illustrated in FIG. 2.

A cam 60 is provided with two identical cam surfaces 61 and 62 at diametrically opposite sides and is secured by studs 63 to ratchet 29 thereby to rotate with film advancing shaft 6. Cam 60 cooperates with a slider 64 which is mounted for sliding motion on cartridge base 2 by downturned edges 65 which engage grooves 66 in cartridge base 2. The slider 64 is provided with suitably cut out portions 67, 68 and 69 so that it may slide freely. Slider 64 is urged to the right (FIG. 2) by a coil spring 70 secured to lug 71 on cartridge base 2 and upstanding tab 72 on slider 64. Movement of slider 64 to the right is limited by a lug 73 which is provided with a shock absorber 74 made of an annular piece of rubber or some similar resilient substance. The slider 64 is provided with an extension 75 having an upturned tab 76 which cooperates with cam surfaces 61 and 62 of cam 60 so that slider 64 will be moved to the left, against the bias of spring 70, two times for each revolution of film advancing shaft 6, and will then be drawn back to the right by spring 70 each time the tab 76 passes one of the cam surfaces 61 or 62. The tab 76 is thus a cam follower.

Slider 64 is provided with an upstanding extension 77 to engage and actuate cocking slider 46 when the cartridge is mounted in operative position within the camera body.

FIG. 3 is a view looking into the camera body from the rear with the back half of the camera body removed and shows the shutter cocking and actuating mechanism mounted on the front half of the camera body 83, and illustrates how cocking slider 46 interacts with this mechanism. When the film cartridge is inserted into the camera body, upstanding extension 77 on slider 64 engages cocking slider 46 at surface 84 so that cocking slider 46 will be pushed to the right as slider 64 is moved to the right by rotation of film advancing shaft 6. This motion of cocking slider 46 cocks the shutter mechanism, after which cocking slider 46 is caught and held in the cocked position by latch 47. It will be observed that in FIG. 3 the cocked position of cocking slider 46 is to the right which corresponds to the left in FIG. 1.

The shutter mechanism is actuated by a lever 88 pivotally mounted at 89 on the front half of the camera body 83. Upon clockwise rotation, lever 88 actuates the shutter blades 90 through a mechanism 91 to provide an exposure. The mechanism 91 forms no part of the present invention, and therefore will not be described in any detail. However, this mechanism may be of any suitable type. The lever 88 is biased to rotate in a clockwise direction by a torsion spring 92 mounted around pivot 89 and secured at its ends to projection 93 on lever 88 and lug 94 on the front wall of the camera body 83. Lug 94 also serves to limit the clockwise movement of lever 88. Spring 92 provides the energy to actuate the shutter mechanism 91, and when lever 88 is in the cocked position (as shown in FIG. 3) it is held in its counterclockwise position against the bias of spring 92. Lever 88 is provided with an elongated arcuate opening 95 arranged to admit light passing through aperture 96 in all positions of lever 88.

The cocking slider 46, which imparts the cocking movement to lever 88 when it is moved by cam 60 and slider 64, is mounted for sliding movement on a square shaft 98. The shaft 98 is provided with rounded end portions 99. These rounded portions 99 are mounted in slots 100 and 101 in the front wall of the camera body 83 and are secured by stud 102 at one end and by flat spring 103 and rivet 104 at the other end, in such a way that shaft 98 is rotatably mounted.

Mounted around shaft 98 is a coil spring 105 which biases cocking slider 46 to the left as shown in FIG. 3 (to the right as shown in FIG. 1) and also biases cocking slider 46 for rotation around shaft 98 in a downward direction, opposite to the direction indicated by the arrows in FIGS. 1 and 3. The configuration of the hole by which cocking slider 46 is mounted on shaft 98 is such that cocking slider 46 may rotate in the direction of the arrows against this bias relative to shaft 98, but may not rotate in the other direction any farther than the position shown. This provision for limited rotation of cocking slider 46 relative to shaft 98 is made to eliminate interference between cocking slider 46 and upstanding extension 77 on slider 64. If these two members are aligned when the film cartridge is inserted in the camera body, cocking slider 46 will rotate slightly against the bias of spring 105 so that the cartridge may be inserted, but will be moved by spring 105 back into its operative position when extension 77 is moved by rotation of film advancing shaft 6.

The lever 88 is illustrated in FIG. 3 in the cocked position. If it were uncocked, it would be rotated clockwise to a position abutting against lug 94. When it is in the uncocked position and cocking slider 46 is actuated to cock lever 88, surface 106 on cocking slider 46 engages surface 107 on lever 88 and continued movement of cocking slider 46 to the right (FIG. 3) causes counterclockwise rotation of lever 88 against the bias of spring 92. When lever 88 has moved to its extreme counterclockwise position, as illustrated, it is caught and held there by latching member 108.

Latching member 108 is mounted on shaft 98 in the same manner as cocking slider 46, that is, it may rotate slightly in the direction shown by the arrow in FIG. 3 but can rotate in the other direction no further than the position shown; it is constrained against rotation by torsion spring 109. Latching member 108 is provided with a hook-shaped extension 110 which cooperates with a hole 111 in lever 88 to hold lever 88 in its cocked position. As lever 88 is rotated counterclockwise under the influence of cocking slider 46, the hook-shaped extension 110 is rotated, against the bias of spring 109, out of the path of lever 88; but when hook-shaped extension 110 is aligned with hole 111 in lever 88, the extension 110 is urged into hole 111 by spring 109, and thus catches and holds lever 88 in the fully cocked position.

Release of lever 88, and actuation of the shutter mechanism 91 by the resultant clockwise rotation of lever 88 is accomplished by rotating shaft 98. Sleeve member 113, formed to include radial extension 114, is provided to operate in conjunction with a shutter release button 118 to cause rotation of shaft 98. The sleeve member 113 is slidably mounted on shaft 98, but may not rotate relative thereto. Shutter release button 118 is mounted in hole 119 in the front half of the camera body 83 and extends outside the camera body where it may be manually depressed by the operator of the camera when he wishes to take a picture. Lever 120 engages shutter release button 118 at one end 121 thereof and radial extension 114 on sleeve member 113 at the other end 122 thereof. Upon depression of shutter release button 118, lever 120 is rotated about its pivot bar 123, thus rotating sleeve 113 and causing shaft 98 to rotate in the direction indicated by the arrows in FIGS. 1 and 3.

The pivot bar 123 for lever 120 is attached to lug 94 and a raised boss 124 on the front half of the camera body 83, and lever 120 is spring biased into engagement with shutter release button 118 by a hairpin spring 125 which passes beneath pivot bar 123 and has an end 126 thereof engaged with a notch 127 in the lever 120. The other end 128 of hairpin spring 125 rides on shaft 98.

When shaft 98 is rotated in the direction of the arrows, latching member 108 is rotated and hook-shaped extension 110 is withdrawn from hole 111 in lever 88, and lever 88 is released to rotate clockwise and actuate the shutter blades 90. Rotation of shaft 98 also causes cocking slider 46 to rotate in the same direction; this disengages groove 48 in cocking slider 46 from latch 47 and moves surface 84 to a position where it will be clear of upstanding extension 77 on slider 64, and cocking slider 46 accordingly moves to the left (to the right in FIG. 1) under the influence of spring 105. This motion of cocking slider 46 causes lever 37 to withdraw second pawl 31 from ratchet 29, as previously discussed, thus unlocking film advancing shaft 6 so that the film may be advanced.

From the foregoing it may be seen that depression of shutter release button 118 both actuates the shutter and releases film advancing shaft 6, while winding of film advancing shaft 6 both cocks the shutter and advances a metered quantity of film, after which it is locked.

The operation of the metering and interlocking device of this invention is as follows:

The camera operator places a fresh spool of film in the film cartridge by placing its lower end in bushing 12 and its upper end in the spring clip (not shown) mounted on top of focal cone 3, and an empty spool is similarly mounted in hole 8 in film advancing shaft 6. These two spools are the supply spool and take-up spool, respectively. The "leader" of the film strip is unwound from the supply spool, extended across focal cone 3, and engaged with the take-up spool. The film cartridge is then inserted into the camera body and latched into place.

It is now necessary to wind up the "leader" on the take-up spool, and to accomplish this, the operator moves handle 57 to the right, causing the vertically extending end portion 51 of rod 50 to engage second pawl 31 and hold it out of engagement with ratchet 29. This prevents the film metering mechanism from locking film advancing shaft 6. The operator then rotates knob 10 which in turn rotates film advancing shaft 6 and winds the "leader" up on the take-up spool.

As the "leader" is advanced past focal cone 3, it is forced by detent 17 into engagement with resilient strip 16 on film metering wheel 13 causing film metering wheel 13 to rotate. At the same time, cocking slider 46 is moved to its cocked position by cam 60 and slider 64, thus cocking the shutter by causing lever 88 to rotate counterclockwise, and is locked in that position by latch 47. With cocking slider 46 in this position, lever 37 is rotated clockwise, upturned tab 42 is moved away from upturned tab 24, and first pawl 18 is urged by spring 22 into engagement with the lower periphery of metering wheel 13.

The metering wheel 13, actuated by the "leader," continues to rotate until notch 21 comes into alignment with first pawl 18 at which time first pawl 18 is forced into notch 21 by spring 22. This causes a clockwise movement of first pawl 18, moving it away from downturned tab 36 on second pawl 31, and normally second pawl 31, thus freed, would be urged by spring 33 into engagement with ratchet 29, locking the film advancing shaft 6. But second pawl 31 is restrained from such movement by the vertically extending end portion 51 of rod 50 so film advancing shaft 6 may continue to be rotated until the entire "leader" is wound up on the take-up spool and the number "1" on the film appears in the window on the back of the camera housing. Film metering wheel 13 is locked against rotation after first pawl 18 engages notch 21, and the "leader" is dragged past it after this occurs until the number "1" appears. This locking of film metering wheel 13 during the winding of the "leader" strip is important in that it insures proper metering after the first picture is taken by insuring that notch 21 and first pawl 18 will be aligned when the first picture is taken.

Upon observing the number "1," the operator moves handle 57 to the left thus withdrawing the vertically extending end portion 51 of rod 50 from the path of second pawl 31 and permitting it to engage ratchet 29. The metering device is thus actuated, the shutter cocked, and the camera ready to take the first picture.

When the operator takes the first picture, he depresses shutter release button 118. This rotates shaft 98 in the direction indicated, releasing lever 88 which rotates clockwise and in so doing actuates the shutter blades 90 to allow light to enter the camera body and expose the film. Rotation of shaft 98 also releases cocking slider 46 from its latch 47 permitting it to move to its uncocked position, to the right in FIG. 1, and release of cocking slider 46 permits lever 37 to rotate counterclockwise so upturned tab 42 will engage upturned tab 24 on first pawl 18 and rotate it counterclockwise, withdrawing first pawl 18 from notch 21 on metering wheel 13. The counterclockwise rotation of first pawl 18 causes it to engage downturned tab 36 on second pawl 31 also rotating it counterclockwise out of engagement with ratchet 29. This releases film advancing shaft 6 and permits the operator to advance the film for the second picture. Double exposure on the first picture is prevented because the shutter cannot be actuated again unless it has first been cocked, and it cannot be cocked until the film is advanced.

The operator then advances the film. This causes film metering wheel 13 to rotate and also moves cocking slider 46, under the influence of cam 60 and slider 64, to its cocked position where it is latched by latch 47. The movement of cocking slider 46 causes lever 88 to be rotated counterclockwise to its cocked position where it is caught and held by hook-shaped extension 110 on latching member 108, and also causes lever 37 to be rotated clockwise moving upturned tab 42 away from upturned tab 24, thus permitting first pawl 18 to rotate clockwise so that it engages and rides upon the periphery of film metering wheel 13. Second pawl 31 is still kept from engaging ratchet 29 by its downturned tab 36 which engages first pawl 18.

Continued advancement of the film causes film metering wheel 13 to continue to rotate until notch 21 in its periphery is again, after one complete revolution, aligned with first pawl 18 at which time first pawl 18 falls into notch 21. This causes first pawl 18 to rotate clockwise out of engagement with downturned tab 36 on second pawl 31 and permits second pawl 31 to rotate clockwise so that it engages ratchet 29, locking film advancing shaft 6 against further rotation. Since the circumference of the resilient strip 16 on film metering wheel 13 is exactly equal to the amount of film required for a picture, and film metering wheel 13 makes one complete revolution before film advancing shaft 6 is locked, the appropriate amount of film will be advanced for the second picture.

The shutter is now cocked, the appropriate amount of film advanced, and the camera ready for the second picture. To take this picture, the operator again depresses shutter release button 118, actuating the shutter mechanism and unlocking the film metering device as has previously been described. He then again rotates film advancing shaft 6, thus cocking the shutter and advancing a metered amount of film, and this process is repeated until all of the film, usually enough for twelve pictures, has been exposed.

After the last picture has been taken, it is necessary to wind up the film "trailer" strip onto the take-up spool. To accomplish this, the operator merely slides bar 50 to the right again, as was done in winding up the "leader" strip. This moves the vertically extending end portion 51 on rod 50 to prevent second pawl 31 from engaging ratchet 29, and the film advancing shaft will rotate freely to permit the "trailer" strip to be wound up on the take-up spool. Again film metering wheel 13 will be locked after one complete revolution, and the "trailer" strip dragged between it and detent 17 after this first revolution. After the entire "trailer" strip has been wound up on the take-up spool the film cartridge is removed from the camera, the exposed spool of film removed from it, and a fresh spool of film inserted. The entire process is then repeated for the next roll of film.

While particular embodiments of this invention have been shown and described, further modifications will occur to those skilled in the art. It is to be understood therefore that this invention is not limited to the specific embodiments shown, and it is intended that the appended claims cover all modifications which do not depart from the spirit and scope of this invention.

What is claimed is:

1. In a roll film camera having a camera body, a shutter mechanism and a film winding mechanism, the combination comprising a film metering wheel rotatably mounted in said camera and arranged so that a peripheral surface of said wheel engages and is rotated by the film upon operation of said film winding mechanism, said film metering wheel having a notch, a ratchet wheel connected to said film winding means and arranged to rotate upon operation of the latter, first and second pawls pivotally mounted in said camera, first biasing means arranged to urge said first pawl into engagement with said notch, second biasing means arranged to urge said second pawl into engagement with said ratchet wheel to lock said film winding means against operation, means on one of said pawls arranged to contact the other of said pawls and to hold said second pawl out of engagement with said ratchet wheel except when said first pawl engages said notch, a shutter cocking mechanism, and means arranged to hold said pawls out of engagement with said notch and said ratchet wheel when said shutter is uncocked and to free said pawls for engagement with said notch and said ratchet wheel when said shutter is being cocked.

2. In a roll film camera having a camera body, a shutter mechanism and a film winding mechanism, the combination comprising a film metering wheel rotatably mounted in said camera and arranged so that a peripheral surface of said wheel engages and is rotated by the film upon operation of said film winding mechanism, said film metering wheel having a peripheral notch, a ratchet wheel connected to said film winding means and arranged to rotate upon operation of the latter, first and second pawls pivotally mounted in said camera about a common point, first spring means arranged to urge said first pawl into engagement with said notch, second spring means arranged to urge said second pawl into engagement with said ratchet wheel to lock said film winding means against operation, means on one of said pawls arranged to contact the other of said pawls and to hold said second pawl out of engagement with said ratchet wheel except when said first pawl engages said notch, a shutter cocking mechanism, and means interconnecting said shutter cocking mechanism and said pawls and arranged to hold said pawls out of engagement with said notch and said ratchet wheel when said shutter is uncocked and to free said pawls for engagement with said notch and said ratchet wheel when said shutter is being cocked.

3. In a roll film camera having a camera body, a shutter mechanism and a film winding mechanism, the combination comprising a film metering wheel rotatably mounted in said camera and arranged so that a peripheral surface of said wheel engages and is rotated by the film upon operation of said film winding mechanism, said film metering wheel having a peripheral notch, a ratchet wheel connected to said film winding means and arranged to rotate upon operation of the latter, first and second pawls pivotally mounted in said camera about a common point, first spring means arranged to urge said first pawl into engagement with said notch, second spring means arranged to urge said second pawl into engagement with said ratchet wheel to lock said film winding means against operation, means on one of said pawls arranged to contact the other of said pawls and to hold said second pawl out of engagement with said ratchet wheel except when said first pawl engages said notch, a shutter cocking mechanism, and means interconnecting said shutter cocking mechanism and said pawls, said last mentioned means comprising a lever arranged to pivot about said common point and operatively connected to said shutter cocking mechanism, said lever having a tab arranged to engage said first pawl to move said first pawl out of engagement with said notch when said shutter is uncocked and to free said first pawl for engagement with said notch when said shutter is being cocked.

4. In a roll film camera having a camera body, a shutter mechanism and a film winding mechanism, the combination comprising a film metering wheel rotatably mounted in said camera and arranged so that a peripheral surface of said wheel engages and is rotated by the film upon operation of said film winding mechanism, the length of said peripheral surface being equal to the pitch of adjacent exposure areas on said film, said film metering wheel having a peripheral notch, a ratchet wheel connected to said film winding means and arranged to rotate upon operation of the latter, first and second pawls pivotally mounted in said camera about a common point, first spring means arranged to urge said first pawl into engagement with said notch, second spring means arranged to urge said second pawl into engagement with said ratchet wheel to lock said film winding means against operation, a first tab on said second pawl arranged to contact an edge of said first pawl and to hold said second pawl out of engagement with said ratchet wheel except when said first pawl engages said notch, a shutter cocking mechanism, and means interconnecting said shutter cocking mechanism and said pawls, said last mentioned means comprising a lever arranged to pivot about said common point and operatively connected to said shutter cocking mechanism, said lever having a second tab arranged to engage said first pawl, third spring means arranged to pivot said lever in a direction to pivot said first pawl out of engagement with said notch and thereby to pivot said second pawl out of engagement with said ratchet wheel, said third spring means having a strength greater than the combined strengths of said first and second spring means, said connection between said shutter cocking mechanism and said lever being arranged to pivot said lever against the action of said third spring means when said shutter mechanism is being cocked and to free said lever for pivoting motion under action of said third spring means when said shutter mechanism is uncocked.

5. In a roll film camera having a camera body, a shutter mechanism and a film winding mechanism having a film winding shaft, the combination comprising a film metering wheel rotatably mounted in said camera and arranged so that a peripheral surface of said wheel engages and is rotated by the film upon operation of said film winding mechanism, the length of said peripheral surface being equal to the pitch of adjacent exposure areas on said film, said film metering wheel having a peripheral notch, a ratchet wheel mounted on said film winding shaft and arranged to rotate upon rotation of the latter, first and second pawls pivotally mounted in said camera about a common point, first spring means arranged to urge said first pawl into engagement with said notch, second spring means arranged to urge said second pawl into engagement with said ratchet wheel to lock said film winding shaft against rotation, means on said second pawl arranged to contact said first pawl and to hold said second pawl out of engagement with said ratchet wheel except when said first pawl engages said notch, a shutter cocking mechanism, means interconnecting said shutter cocking mechanism and said pawls and arranged to hold said pawls out of engagement with said notch and said ratchet wheel when said shutter is uncocked and to free said pawls for engagement with said notch and said ratchet wheel when said shutter is being cocked, and manually operable means to hold said second pawl out of engagement with said ratchet wheel.

6. In a roll film camera including a camera body, a film advancing shaft, and a shutter mechanism, the combination comprising a film metering wheel formed to include a notch on its periphery and mounted so as to have a peripheral surface thereof engaged and rotated by the film in the camera as the film advances, a first pawl spring-biased into engagement with the periphery of the metering wheel and so proportioned that it will fall into said notch when aligned therewith, a ratchet mounted on the film advancing shaft, a second pawl spring-biased into engagement with said ratchet, a tab on said second pawl cooperating with said first pawl so that said second pawl may engage said ratchet only when said first pawl is in said notch on the periphery of said metering wheel, a cam mounted on said film advancing shaft, a cocking slider actuated by said cam to cock said shutter mechanism as the film is advanced, a lever actuated by said cocking slider and having a tab arranged to cooperate with said first pawl so that when said cocking slider is moved to the uncocked position thereof said first pawl will be moved out of engagement with said notch and said second pawl will be moved out of engagement with said ratchet but when the cocking slider is in its cocked position said first pawl will be free to engage the periphery of the film metering wheel and drop into said notch after a predetermined amount of film has been advanced thus permitting said second pawl to engage and lock said ratchet, and a rod having an upturned end and movable to a position where said upturned end prevents said second pawl from engaging said ratchet on the film advancing shaft.

7. In a roll film camera having a camera body, a shutter mechanism and a film winding mechanism including a film winding shaft, the combination comprising a film metering wheel rotatably mounted in said camera and arranged so that a peripheral surface of said wheel engages and is rotated by the film upon rotation of said film winding shaft, the length of said peripheral surface being equal to the pitch of adjacent exposure areas on said film, said film metering wheel having a peripheral notch, a ratchet wheel mounted on said film winding shaft and arranged to rotate therewith, first and second pawls pivotally mounted in said camera about a common point, first spring means arranged to urge said first pawl into engagement with said notch, second spring means arranged to urge said second pawl into engagement with said ratchet wheel to lock said film winding shaft against rotation, means on one of said pawls arranged to contact the other of said pawls and to hold said second pawl out of engagement with said ratchet wheel except when said first pawl engages said notch, a shutter cocking mechanism including a cocking slider slidably mounted for motion between an uncocked position and a cocked position, a cam mounted on and arranged to rotate with said film winding shaft, a cam follower interconnecting said cam and said cocking slider and arranged so that rotation of said film winding shaft during film winding causes said cocking slider to be moved in shutter cocking direction to said cocked position thereof, a lever pivotally mounted in said camera, a connection between said lever and said first pawl, third spring means urging said lever to pivot in a first direction so that said connection pivots said first pawl out of engagement with said notch and whereby said first pawl pivots said second pawl out of engagement with said ratchet wheel, and means interconnecting said lever and said cocking slider and arranged so that movement of said cocking slider from said cocked position to said uncocked position thereof permits said third spring means to pivot said lever in said first direction and so that movement of said cocking slider to said cocked position thereof pivots said lever in a direction opposite to said first direction thereby to free said first pawl for engagement with said notch.

8. In a roll film camera having a camera body, a shutter mechanism and a film winding mechanism including a film winding shaft, the combination comprising a film metering wheel rotatably mounted in said camera and arranged so that a peripheral surface of said wheel engages and is rotated by the film upon rotation of said film winding shaft, the length of said peripheral surface being equal to the pitch of adjacent exposure areas on said film, said film metering wheel having a peripheral notch, a ratchet wheel mounted on said film winding shaft and arranged to rotate therewith, first and second pawls pivotally mounted in said camera about a common point, first spring means arranged to urge said first pawl into engagement with said notch, second spring means arranged to urge said second pawl into engagement with said ratchet wheel to lock said film winding shaft against rotation, means on one of said pawls arranged to contact the other of said pawls and to hold said second pawl out of engagement with said ratchet wheel except when said first pawl engages said notch, a shutter cocking mechanism including a cocking slider slidably mounted for motion between an uncocked position and a cocked position, means biasing said cocking slider toward the uncocked position thereof, a cam mounted on and arranged to rotate with said film winding shaft, a cam follower interconnecting said cam and said cocking slider and arranged so that rotation of said film winding shaft during film winding causes said cocking slider to be moved in shutter cocking direction to said cocked position thereof, a lever pivotally mounted to said common point, a tab on said lever arranged to contact said first pawl, third spring means urging said lever to pivot in a first direction so that said tab pivots said first pawl out of engagement with said notch and whereby said first pawl pivots said second pawl out of engagement with said ratchet wheel, means interconnecting said lever and said cocking slider and arranged so that movement of said cocking slider from said cocked position to said uncocked position thereof permits said third spring means to pivot said lever in said first direction and so that movement of said cocking slider to said cocked position thereof pivots said lever in a direction opposite to said first direction thereby to free said first pawl for engagement with said notch, releasable means to retain said cocking slider in said cocked position thereof, and manually operable exposure means arranged when operated to actuate said shutter mechanism to make an exposure and to release said releasable means to free said cocking slider for motion to said uncocked position thereof.

9. In a roll film camera having a camera body, a shutter mechanism and a film winding mechanism including a film winding shaft, the combination comprising a film metering wheel rotatably mounted in said camera and arranged so that a peripheral surface of said wheel engages and is rotated by the film upon rotation of said film winding shaft, the length of said peripheral surface being equal to the pitch of adjacent exposure areas on said film, said film metering wheel having a peripheral notch, a ratchet wheel mounted on said film winding shaft and arranged to rotate therewith, first and second pawls pivotally mounted in said camera about a common point, first spring means arranged to urge said first pawl into engagement with said notch, second spring means arranged to urge said second pawl into engagement with said ratchet wheel to lock said film winding shaft against rotation, means on one of said pawls arranged to contact the other of said pawls and to hold said second pawl out of engagement with said ratchet wheel except when said first pawl engages said notch, a shutter cocking mechanism including a cocking slider slidably and rotatably mounted for motion between an uncocked position and a cocked position, third spring means biasing said cocking slider toward the uncocked position thereof, a cam mounted on and arranged to rotate with said film winding shaft, a cam follower interconnecting said cam and said cocking slider and arranged so that rotation of said film winding shaft during film winding causes said cocking slider to be moved in shutter cocking direction to said cocked position thereof, a lever pivotally mounted to said common point, a tab on said lever arranged to contact said first pawl, fourth spring means urging said lever to pivot in a first direction so that said tab pivots said first pawl out of engagement with said notch and whereby said first pawl pivots said second pawl out of engagement with said ratchet wheel, said fourth spring means being stronger than the combined strengths of said first and second spring means, means interconnecting said lever and said cocking slider and arranged so that movement of said cocking slider from said cocked position to said uncocked position thereof permits said fourth spring means to pivot said lever in said first direction and so that movement of said cocking slider to said cocked position thereof pivots said lever in a direction opposite to said first direction thereby to free said first pawl for engagement with said notch, releasable means to retain said cocking slider in said cocked position thereof, said releasable means being arranged to release said cocking slider upon rotation of said cocking slider, manually operable exposure means arranged when operated to actuate said shutter mechanism to make an exposure and to rotate said cocking slider to release the latter from said cocked position thereof whereby said third spring means moves said cocking slider to said uncocked position thereof, and a manually operable arm arranged to contact said second pawl and when operated to pivot said second pawl out of engagement with said ratchet.

10. In a roll film camera including a camera body, a film winding shaft and a cocking-type shutter mechanism, the combination comprising a metering disk mounted in said camera body and arranged to rotate with said film as said film is wound on said film winding shaft, a first pawl pivotally mounted in said camera and spring-biased into engagement with said disk, pawl engaging means on said disk, said disk being arranged so that said first pawl engages said pawl engaging means each time said disk rotates an amount corresponding to the pitch of adjacent exposure areas on said film, a ratchet on said film winding shaft, a second pawl pivotally mounted in said camera and being spring-urged into engagement with said ratchet to prevent rotation of said film winding shaft, a connection between said first and second pawls arranged so that said first pawl retains said second pawl out of engagement with said ratchet except when said first pawl engages said pawl engaging means, a cocking mechanism including a cocking slider for cocking said shutter mechanism, means carried on said film winding shaft and operated by rotation of the latter to actuate said cocking mechanism, and means comprising a pivoted lever operatively engaging said cocking slider and arranged to contact said first pawl to hold said first pawl out of engagement with said pawl engaging means and said second pawl out of engagement with said ratchet when said shutter mechanism is uncocked.

11. In a roll film camera including a camera body, a film winding shaft and a cocking-type shutter mechanism, the combination comprising a metering disk mounted in said camera body and arranged to rotate with said film as said film is wound on said film winding shaft, a first pawl pivotally mounted in said camera and spring-biased into engagement with said disk, pawl engaging means on said disk, said disk being arranged so that said first pawl engages said pawl engaging means each time said disk rotates an amount corresponding to the pitch of adjacent exposure areas on said film, a ratchet on said film winding shaft, a second pawl pivotally mounted in said camera about the pivot point of said first pawl, said second pawl being spring-urged into engagement with said ratchet to prevent rotation of said film winding shaft, a connection between said first and second pawls arranged so that said first pawl retains said second pawl out of engagement with said ratchet except when said first pawl engages said pawl engaging means, a shutter cocking mechanism including a cocking slider movable between cocked and uncocked positions for cocking said shutter mechanism, means carried on said film winding shaft and operated by rotation of the latter to actuate said cocking mechanism, and means comprising a lever pivotally mounted in said camera about the pivot point of said first pawl and operatively engaging said cocking slider and arranged to contact said first pawl to hold said first pawl out of engagement with said pawl engaging means and said second pawl out of engagement with said ratchet when said shutter mechanism is uncocked.

12. In a roll film camera of the cartridge type including a camera body, a cocking-type shutter mechanism mounted on the camera body, and a film cartridge adapted to carry a full film spool and an empty film spool and to be inserted in the camera body, said cartridge having a film winding shaft arranged to rotate the empty spool to wind thereon film from the full spool, the combination comprising a locking device mounted on the film cartridge to lock the film winding shaft against further rotation after a predetermined amount of film has been advanced, a cam mounted on and arranged to rotate with said film winding shaft, a slider on the film cartridge arranged to be actuated by said cam, means on said camera body operatively connected to said slider and arranged to cock said shutter mechanism as said slider is actuated by rotation of said film winding shaft, a lever interconnecting said locking device and said slider and arranged to disable said locking device when said shutter is uncocked, said locking device being rendered operative after said shutter is cocked by rotation of said film winding shaft, and manually operable means to disable said locking device.

References Cited in the file of this patent
UNITED STATES PATENTS 2,860,559    Maiershofer    Nov. 18, 1958

FOREIGN PATENTS 753,122    Great Britain    July 18, 1956
840,280    Great Britain    July 6, 1960
210,255    Austria    July 25, 1960